(No Model.)

A. BASCARY.
HEATING APPARATUS FOR CARRIAGES OR RAILWAY CARS.

No. 545,442. Patented Sept. 3, 1895.

Witnesses:
H. K. Boulter
O. Northup

Inventor:—
Arthur Bascary
By Wm. E. Boulter
Attorney

UNITED STATES PATENT OFFICE.

ARTHUR BASCARY, OF PARIS, FRANCE.

HEATING APPARATUS FOR CARRIAGES OR RAILWAY-CARS.

SPECIFICATION forming part of Letters Patent No. 545,442, dated September 3, 1895.

Application filed June 26, 1895. Serial No. 554,099. (No model.) Patented in France December 22, 1894, No. 243,765.

*To all whom it may concern:*

Be it known that I, ARTHUR BASCARY, a citizen of the French Republic, residing at Paris, France, have invented certain new and useful Improvements in Heating Devices or Apparatus, (for which Letters Patent have been obtained in France, No. 243,765, dated December 22, 1894,) of which the following is a full, clear, and exact description.

My invention has relation to heating devices or apparatus adapted for various purposes—as, for instance, for heating apartments, dishes, &c—said devices being also adapted for use as foot-warmers in vehicles or otherwise, and among the objects in view is to provide a simple, economical, and readily-controlled heater adapted for various heating purposes; and the invention consists in the novel construction, arrangement, and combination of parts, as hereinafter fully described, illustrated in the accompanying drawings, and pointed out in the appended claims.

Figure 1:
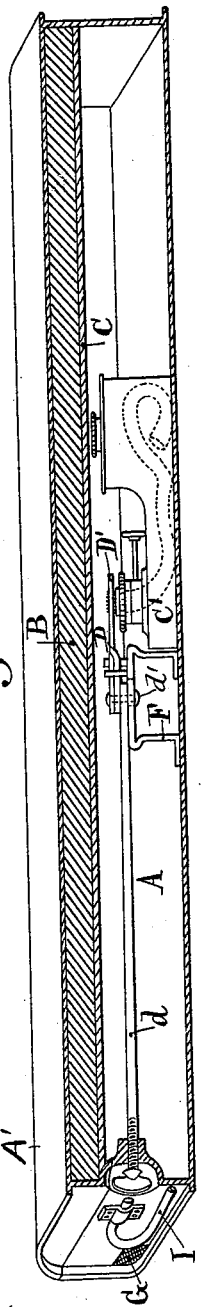
Figure 3:
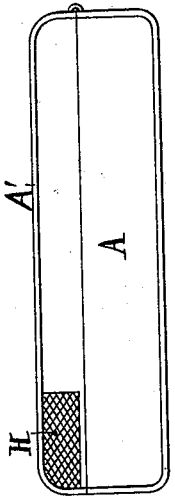
Figure 2:
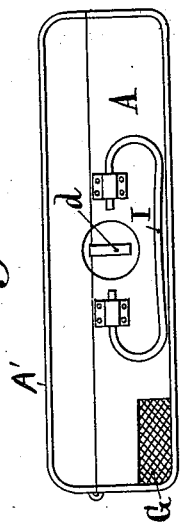
Figure 5:
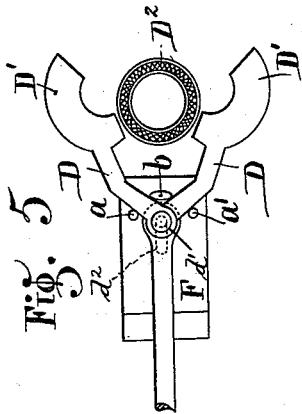
Figure 4:
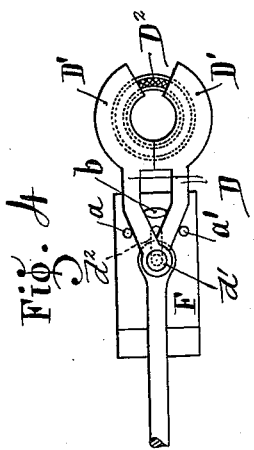

In the drawings, Figure 1 is a sectional perspective view of my improved heating device. Fig. 2 is an end elevation thereof. Fig. 3 is an opposite end elevation. Fig. 4 is a plan view showing the flame-controlling arms partially covering the wick of the lamp. Fig. 5 is a plan view showing the arms as entirely uncovering the wick.

In carrying out my invention I provide a casing A, preferably of metal, which casing may be of any desired or suitable shape and size. I show the same as being of rectangular flat shape, and the same is provided with a hinged lid or cover A', and within the casing at its upper part is provided a plate C, preferably of copper, as such metal is a good conductor of heat. Within the space between the plate C and the lid or cover A' of the casing is arranged a plate or body B, of some refractory material or earth, such as porcelain, and below the plate C, I arrange one or more lamps adapted for producing the requisite heat.

The number of lamps that may be employed may of course be varied and will depend to some extent upon the size of the device and quantity of heat desired.

In the drawings I show a single lamp C', made of a shape to adapt it to be readily inserted in place in the device. This lamp contains at least one wick $D^2$, preferably round, and the latter may be fed with any suitable mineral or vegetable oil. Preferably an oil emitting but little or no odor is used.

G and H are respectively air admission and outlet openings provided in the ends of the casing.

For the purpose of regulating the size of the flame, and consequently the amount of heat given out thereby, I provide the following devices: $d$ is a rod, one end of which projects through the end of the casing and is adapted to be moved inwardly and outwardly, for a purpose presently apparent, and said rod may be threaded where it passes through the casing, as shown, and the inner end of the rod has pivotally connected to it by a pin $d'$ arms D, whose opposite ends are broadened, as at D', and are curved, whereby they are adapted when closed toward each other to partially cover the wick of the lamp, as seen in Fig. 4, and when moved away from each other to entirely uncover said wick, as seen in Fig. 5. The pin $d'$ projects downwardly within a slot $d^2$ in a support F, carried by the casing, and for the purpose of causing the arms to spread apart or close together when the rod $d$ is moved inwardly or outwardly I provide upwardly-projecting pins $a\ a'\ b$, arranged as shown, the pins $a\ a'$ being adapted to bear upon the outer edges of the arms, while the pin $b$ is arranged between the arms and adapted to bear against the inner adjacent edges thereof. Thus the arms will be spread apart when rod $d$ is moved inwardly and closed together when said rod is moved outwardly.

I are suitable handles for the device.

In use, after the wick has been lighted, the arms are made to uncover the wick until the plate B has become sufficiently heated, after which the arms are closed together, so as to partly cover the wick, thus leaving only a small flame to keep the temperature of the porcelain plate even and uniform.

What I claim, and desire to secure by Letters Patent, is—

1. In a device of the character described, the combination with a casing, of a lamp arranged therein, a plate of refractory material as specified adapted to be heated by the lamp, an adjustable rod carried by the casing, one end projecting through the casing, arms pivotally connected to the opposite or inner end of the rod, and guide pins arranged and adapted to effect the spreading or closing of the arms in the manner described when the rod is moved respectively inwardly and outwardly, for the purpose set forth.

2. In a device of the character described, the combination with a casing, of a lamp arranged therein, a plate of refractory material as specified adapted to be heated by the lamp, an adjustable rod carried by the casing, one end of said rod projecting through the latter, arms pivotally connected to the opposite or inner end of the rod, guide pins $a\ a'$, arranged to bear upon the outer edges of the arms, and the pin $b$ arranged to bear upon the inner adjacent edges of said arms whereby to effect the spreading and closing of the latter when the rod is moved respectively inwardly and outwardly, for the purpose set forth.

3. The combination with the casing having a hinged lid and air-admission and outlet openings, of the plate of refractory material carried in the upper part of the casing, the lamp arranged within the casing below the refractory plate, the horizontally movable rod projecting at one end through the casing, arms pivotally connected at one end to the inner end of the rod and the opposite ends of the arms being adapted to uncover and partially cover the wick of the lamp, the pins $a$ $a'\ b$, arranged to bear upon the outer and inner edges of the arms for the purpose specified, and the support F having a slot within which works the pivotal pin of the arms, all as described.

In testimony that I claim the foregoing I have hereunto set my hand this 30th day of May, 1895.

ARTHUR BASCARY.

Witnesses:
FR. STRETMAN,
CLYDE SHROPSHIRE.